May 12, 1970  E. C. FREBER  3,511,518
VEHICULAR WHEEL ASSEMBLIES

Filed March 6, 1968  3 Sheets-Sheet 1

INVENTOR
ELMER C. FREBER
BY
ATTORNEY

May 12, 1970  E. C. FREBER  3,511,518
VEHICULAR WHEEL ASSEMBLIES

Filed March 6, 1968  3 Sheets-Sheet 2

INVENTOR
ELMER C. FREBER

BY
ATTORNEY

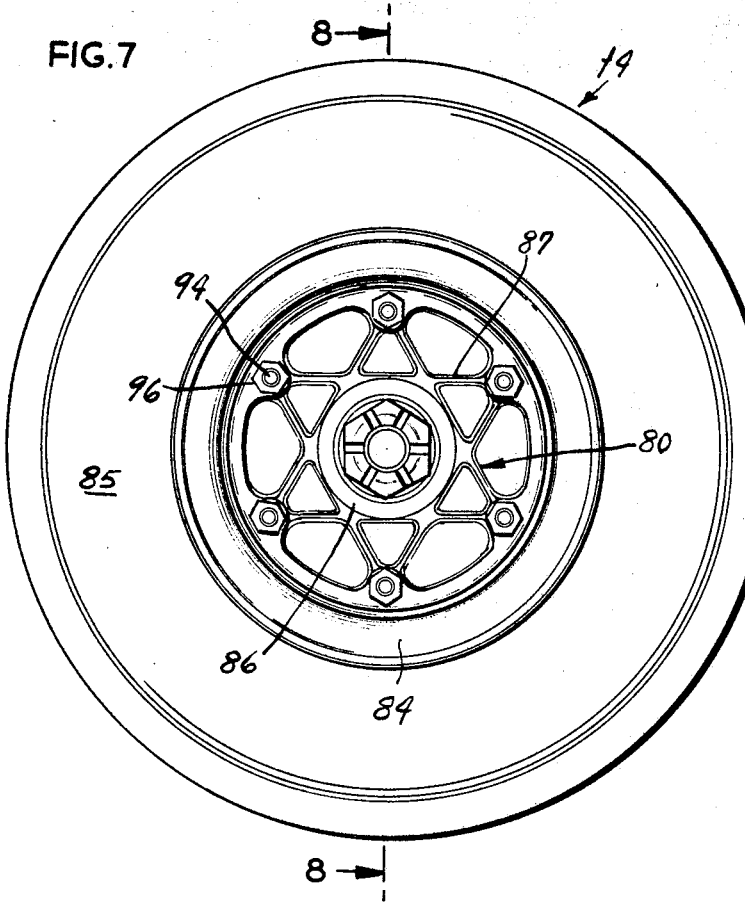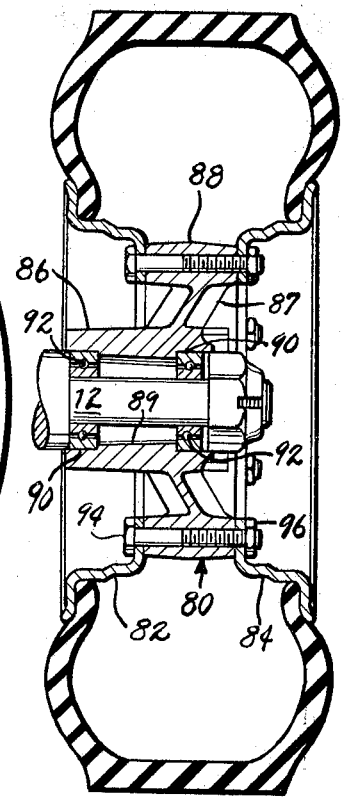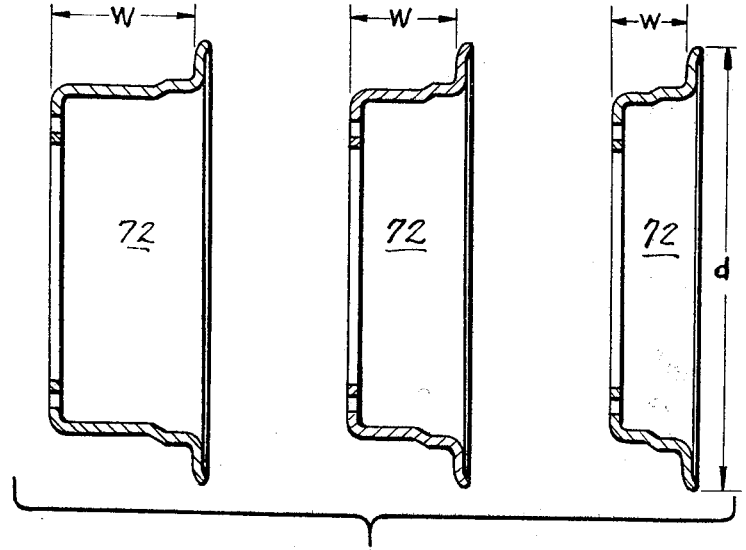

United States Patent Office 3,511,518
Patented May 12, 1970

3,511,518
VEHICULAR WHEEL ASSEMBLIES
Elmer C. Freber, St. Louis, Mo., assignor to Marquette Tool and Die Company, St. Louis, Mo., a corporation of Missouri
Filed Mar. 6, 1968, Ser. No. 710,905
Int. Cl. B60b 1/14
U.S. Cl. 280—80                                          3 Claims

ABSTRACT OF THE DISCLOSURE

A wheel especially for use with go-karts having a central hub section of predetermined size to which rim sections of various widths are attached. In this manner it is possible to obtain numerous combinations without disturbing the hub section.

---

This invention relates in general to vehicular wheels and, more particularly, to wheel assemblies for go-karts.

Conventional go-kart wheels are either solid castings or three-piece assemblies, each assembly consisting of a pair of flanged rims having a hub section interposed between them. The former cannot accommodate tires of varying widths or diameters, while with the latter it has been common practice to alter their widths either by changing hubs or by inserting spacers. This practice affords only a limited number of combinations and is greatly restricted by the construction of the go-kart itself. For example, the new hub must not be so wide that it interferes with nearby components such as brakes or frame members. Moreover, the use of wider hubs often necessitates changing axles to accommodate their greater width. Also this practice does not conveniently permit a shift of the vehicle centerline.

The present invention includes a wheel having a central hub section of predetermined size to which rim sections of varying widths are attached. In this manner it is possible to obtain numerous combinations without disturbing the hub section.

Among the several objects of the present invention may be noted the provision of a wheel, the width of which can be easily and quickly altered to accommodate tires of varying sizes; the provision of a wheel, the width of which can be varied without replacing the hub or the axle upon which it is mounted; and the provision of a wheel which conveniently affords alteration of a vehicle tread width as well as a lateral shifting of its longitudinal centerline. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective view of a go-kart with wheel assemblies constructed in accordance with and embodying the present invention;

FIG. 6 is a sectional view of several rims of lesser diameter also forming part of the present invention;

FIG. 7 is a side elevational view of a front wheel on the go-kart; and

FIG. 8 is a sectional view taken along line 8—8 of FIG. 7.

Corresponding reference characters indicate corresponding parts throughout the several views of the drawings.

Figure 1:
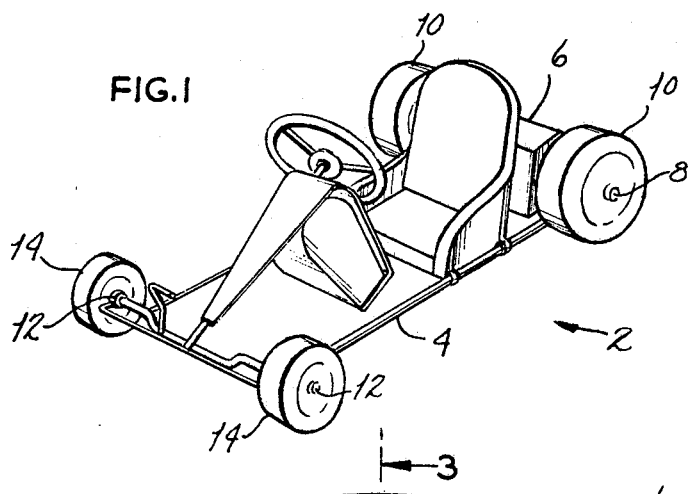

Referring now to the drawings, 2 designates a go-kart including a frame 4, a motor 6, a rear axle 8 on the rear of frame 4 driven by motor 6, a pair of rear wheels 10 keyed to axle 8, a pair of spindles 12 swivelly mounted on the front of frame 4, front wheels 14 on spindles 12, and a steering wheel 16 with associated components for turning spindles 12 in unison.

Figure 2:
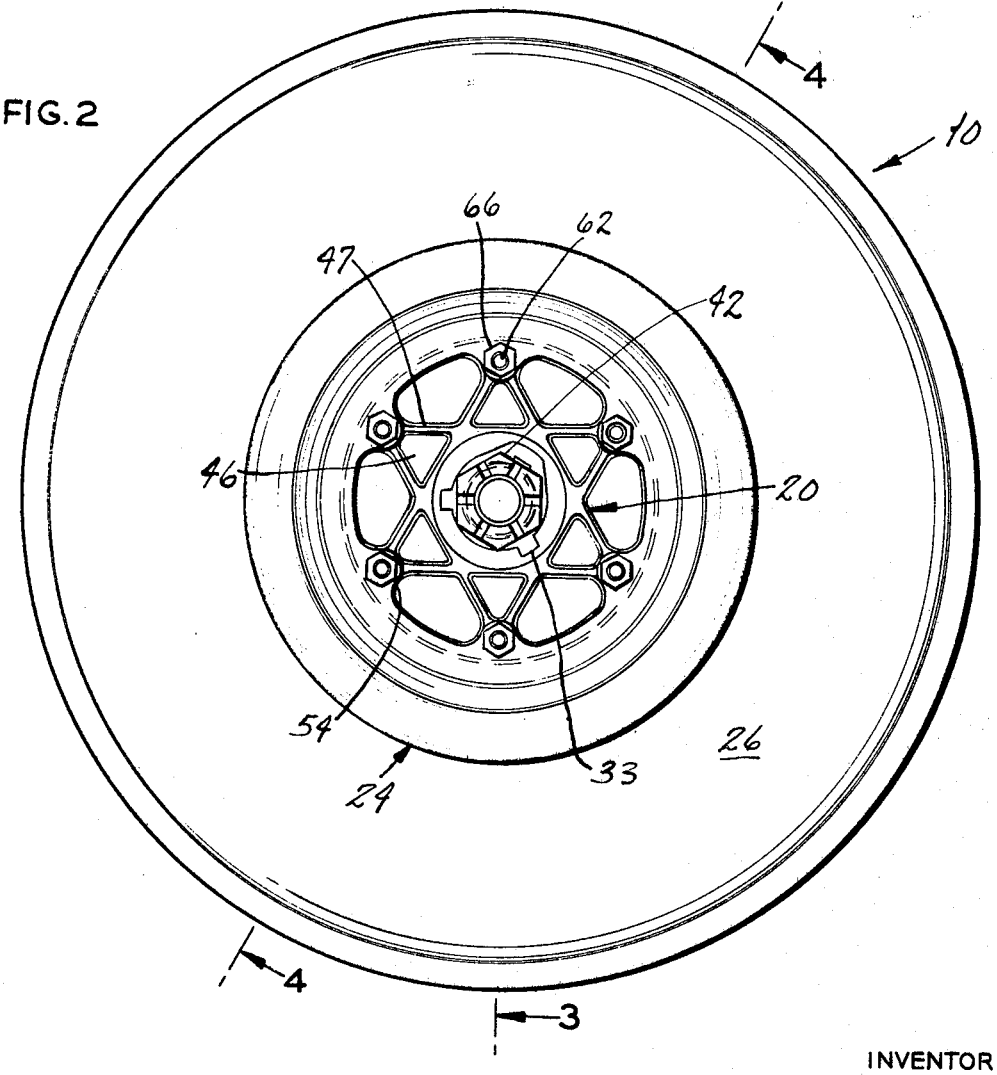
FIG. 2 is a side elevational view of a rear wheel on the go-kart.
Figure 3:
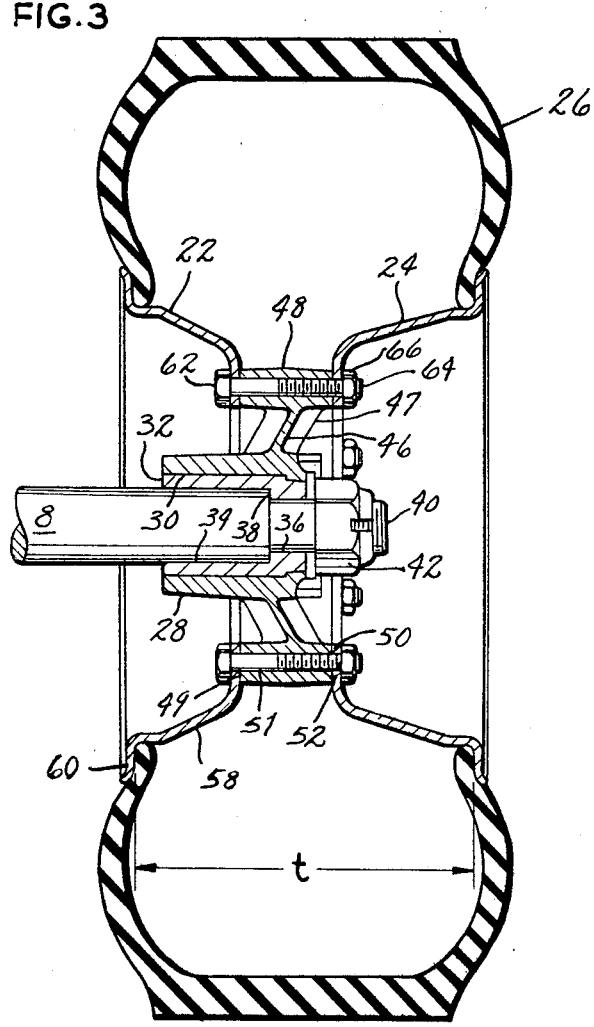
FIG. 3 is a sectional view of the rear wheel taken along line 3—3 of FIG. 2.
Figure 4:
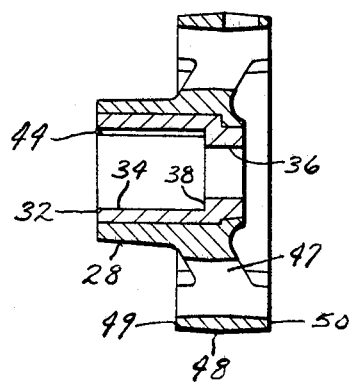
FIG. 4 is a sectional view of the rear hub taken along line 4—4 of FIG. 2.

Referring now to FIGS. 2–4, each rear wheel 10 includes a hub 20, inner and outer rims 22, 24, bolted to hub 20, and a tire 26 mounted on and contained by rims 22, 24. Hub 20 is preferably cast as an integral unit from a lightweight metal such as aluminum and has a collar-like center portion 28 with an axially extending hole 30 into which a steel or other suitable bushing 32 is securely fitted and held fast by radial lugs 33. Bushing 32 has an axially extending bore 34 which opens into a diametrally reduced bore 36 at a shoulder 38. Bore 34 snugly receives rear axle 8, while diametrally reduced bore 36 accepts a threaded end portion 40 on axle 8. Threaded onto end portion 40 and against the outwardly presented face of bushing 32 and hub 20 is a retainer nut 42. Both axle 8 and bushing 32 are grooved for reception of a key 44 to securely lock wheel 10 to rear axle 8.

Cast integral to collar-like center portion 28 along equally spaced radii are a plurality of radially extending generally triangular web-like spokes 46, the sides of which are defined by outwardly converging reinforcing ribs 47. Spokes 46 are canted outwardly at an acute angle with respect to the axial centerline of hub 20 (FIGS. 3 and 4). At their outer ends they merge into an integrally cast annular collar-like peripheral wall 48 having inwardly and outwardly presented abutment faces 49, 50. By reason of outward inclination of spokes 46, wall 48 is outwardly offset with respect to center portion 28. At each juncture of a spoke 46 and peripheral wall 48, hub 20 has an axially extending bolt hole 51 which is threaded inwardly from its outwardly presented end to the approximate midpoint of wall 48.

Rims 22, 24, are preferably stamped from a lightweight metal such as aluminum and each integrally includes an inwardly turned mounting flange 52 sized for facewise abutment against either inwardly or outwardly presented abutment face 49, 50, on wall 48, and projecting still further inwardly from flange 52 are mounting tabs 54 provided with apertures 56 which align with bolt holes 51 in wall 48. Each mounting flange 52 merges along its opposite margin into an outwardly flared wall 58 which merges into an outwardly projecting retaining flange 60 for engaging the inner portion of the side wall forming part of tire 26.

Inner rim 22 is held securely against hub 20 by a plurality of bolts 62 which pass through apertures 56 in mounting flange 52 and thread into holes 51 in peripheral wall 48. When the heads of bolts 62 are drawn tight against mounting tabs 54 mounting flange 52 will facewise abut against inwardly presented abutment face 49, and a short section of each bolt 62 will project beyond the opposite or outwardly presented abutment face 50 in the formation of mounting studs 64. Once tire 26 is passed over hub 20 and brought against retaining flange 60 of inner rim 22, outwardly flared wall 58 of outer rim 24 is fitted into the center of tire 26 and that rim is manipulated until its apertures 56 align with studs 64. Thereupon, outer rim 24 is pressed inwardly and a nut 66 is threaded onto each stud 64 for holding mounting flange 52 of that rim tightly against outwardly presented abutment face 50 of peripheral wall 48.

Figure 5:
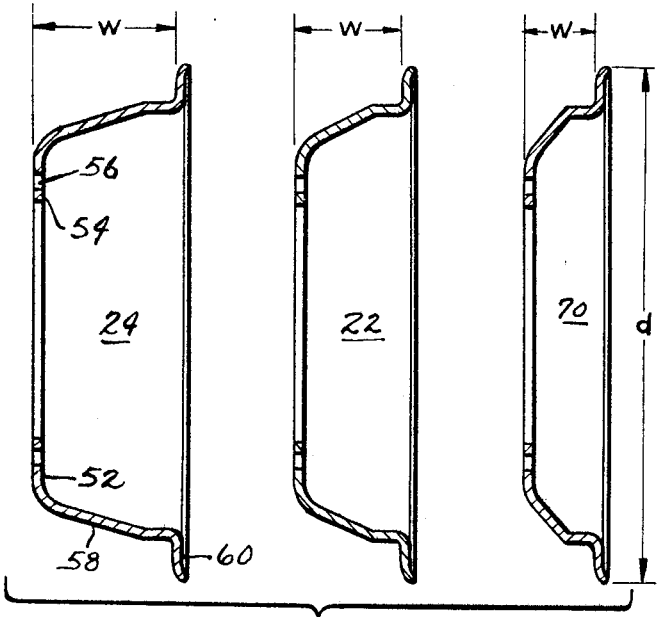
FIG. 5 is a sectional view of several of the rims forming part of the present invention.

Inner and outer rims 22, 24 are interchangeable, that is their positions on hub 20 can be reversed, and either can be replaced by an alternate rim 70 (FIG. 5) of different rim width to accommodate wider or narrower tires as the case may be. The term "rim width" as used herein is the distance between the face of retaining flange 60 against which tire 26 abuts and the face on mounting flange 52 which facewise abuts against peripheral wall 48 on hub 20, and it is designated by the dimension $w$ in FIGS. 5 and 6. Similarly, rims 22, 24, and 70 can be replaced by supplemental rims 72 (FIG. 6) of lesser rim diameter, yet of varying rim widths, to accommodate correspondingly smaller tires. The term "rim diameter" as used herein is the diameter of the outer margin on retaining flanges 60 and is designated by the dimension $d$ in FIGS. 5 and 6. As an example, the diameter of hub 20 may be approximately 4¼ inches, and its width at peripheral wall 48 approximately 1¼ inches. The diameter of the bolt circle defined by bolt holes 51 would then be 3.750 inches. The rim diameter of rims 22, 24, and 70 is normally 7 inches, while rims 72 have a rim diameter of 6 inches. It has been found desirable to supply rims 22, 24, 70, and 72, in widths of 1, 1½, and 2 inches, and by using various combinations of the foregoing rim widths with hub 20 the following tire widths can be accommodated: 3¼, 3¾, 4¼, 4¾, and 5¼ inches. Tire width as used herein is the dimension $t$ (FIG. 3) between the two retaining flanges 60 of inner and outer rims 22, 24.

When the inner and outer rims 22, 24, of rear wheels 10 possess different rim widths, it is possible to alter or control the tread width of the go-kart 2 and along with it the handling characteristics by manipulating these rims on hubs 20. For example, the tread width will be greater when the rim width of outer rim 24 exceeds the rim width of inner rim 22 than when the opposite is true. Similarly, the longitudinal centerline of go-kart 2 can be laterally shifted by manipulating the rims. For example, the longitudinal centerline will shift to the right when the rim width of either inner rim 22 on the left rear wheel 10 or outer rim 24 on the right rear wheel 10 or both are enlarged. This would be desirable when racing in a counterclockwise direction on an oval track. These manipulations change the handling characteristics of go-kart 2 and are important factors for consideration when preparing for a racing event.

Furthermore, these manipulations can be made quite rapidly with little inconvenience to the operator. To replace an outer rim 24 the operator removes nuts 66 from studs 64, withdraws rim 24 and replaces it with alternate rim 70. To change an inner rim 22, hub 20 is removed from axle 8 by removing retainer nut 42 and bolts 62. Thus, the tread width can be altered without changing axles. Also, if it is impossible to compensate for wider tires by expanding the rim inwardly due to the presence of brake assemblies, frame members, or drive sprockets adjacent hub 20, wheels 10 can be expanded outwardly without changing axles by using outer rims of greater rim width.

Referring now to FIGS. 7 and 8, front wheels 14 are similar to rear wheels 10 and each consists of a hub 80, an inner rim 82, an outer rim 84, and a tire 85. Like hub 20, hub 80 includes an integrally cast rollar portion 86, a plurality of spokes 87, and an annular outer peripheral wall 88. While externally hub 80 appears identical to hub 20, its collar portion 86 contains no steel bushing, but is instead provided with an axial bore 89 which is counterbored from each of its ends in the provision of a pair of cylindrical recesses 90 for snug reception of a pair of bearings 92. Spindles 12 pass through the inner races of bearings 92.

Rims 82, 84, are interchangeable with rims 22, 24, 70 (FIG. 5), and 72 (FIG. 6), and are secured to hubs 80 by means of bolts 94 and nuts 96. Normally front rims 82, 84, have 6 inch rim diameters, while rear rims 22, 24, have 7 inch rim diameters. By substituting rims having different rim widths for either rim 82 or 84, or both, it is possible to vary the front tread width of go-kart 2 along with its handling characteristics, the manipulations necessary to achieve the end being substantially the same as those already discussed in connection with rear wheels 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In combination, a vehicle having a first set of wheel assemblies mounted on one of its lateral sides and a second set of wheel assemblies mounted on the other of its lateral sides; a hub on each of said wheel assemblies, said hubs each having a bearing supporting center portion and a plurality of integral spokes extending radially therefrom, said spokes merging into an annular peripheral wall having axial edges providing inwardly and outwardly presented abutment faces; securing means detachably holding an inner and an outer rim against said inner and outer abutment faces respectively; and a tire engaged and held between said inner and outer rims of each of said wheel assemblies; said inner and outer rims having different axial widths so as to axially offset said tires with respect to said peripheral walls and center portions of said wheel assemblies; said tires of said first set of wheel asemblies being offset from said vehicle a distance different than that of said second wheel assemblies so as to cause the longitudinal centerline of said vehicle to be shifted to one side.

2. A wheel assembly for holding the tire of a wheeled vehicle; said assembly comprising a hub having a bearing supporting center portion and a plurality of integral spokes extending radially and axially from said center portion, said spokes merging into an annular collar-like peripheral wall having opposite axial edges providing axially inwardly and outwardly presented abutment faces; a plurality of holes extending axially through said peripheral wall between said inwardly and outwardly presented abutment faces, said holes being provided with threads; and securing means threadably received within said holes and detachably holding an inner and an outer rim against said inwardly and outwardly presented abutment faces respectively; said tire being engaged and held between said rims; one of said rims having an axial width greater than the other of said rims so that said tire is axially offset with respect to said peripheral wall and said center portion.

3. The wheel assembly of claim 2 wherein said spokes are triangular and web-like having sides which are defined by outwardly converging ribs.

References Cited

UNITED STATES PATENTS

| 2,237,481 | 4/1941 | Ferro | 301—35 |
|---|---|---|---|
| 2,165,723 | 7/1939 | North. | |
| 2,229,724 | 1/1941 | Burger | 152—405 X |
| 2,242,425 | 5/1941 | Ferro | 152—405 |
| 2,252,194 | 8/1941 | Mills. | |
| 2,405,954 | 8/1946 | Hollerith | 152—404 X |

FOREIGN PATENTS

| 103,369 | 2/1938 | Australia. |
|---|---|---|
| 1,167,368 | 7/1958 | France. |

RICHARD J. JOHNSON, Primary Examiner

U.S. Cl. X.R.

152—405; 301—63

PO-1050
(5/69)

UNITED STATES PATENT OFFICE
CERTIFICATE OF CORRECTION

Patent No. 3,511,518           Dated May 12, 1970

Inventor(s) Elmer C. Freber

It is certified that error appears in the above-identified patent and that said Letters Patent are hereby corrected as shown below:

Column 2, line 49, "of outward" should read -- of the outward --. Column 3, line 45, "in widths" should read -- in rim widths --. Column 4, line 8, "rollar" should read -- collar --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents